Figure 1:
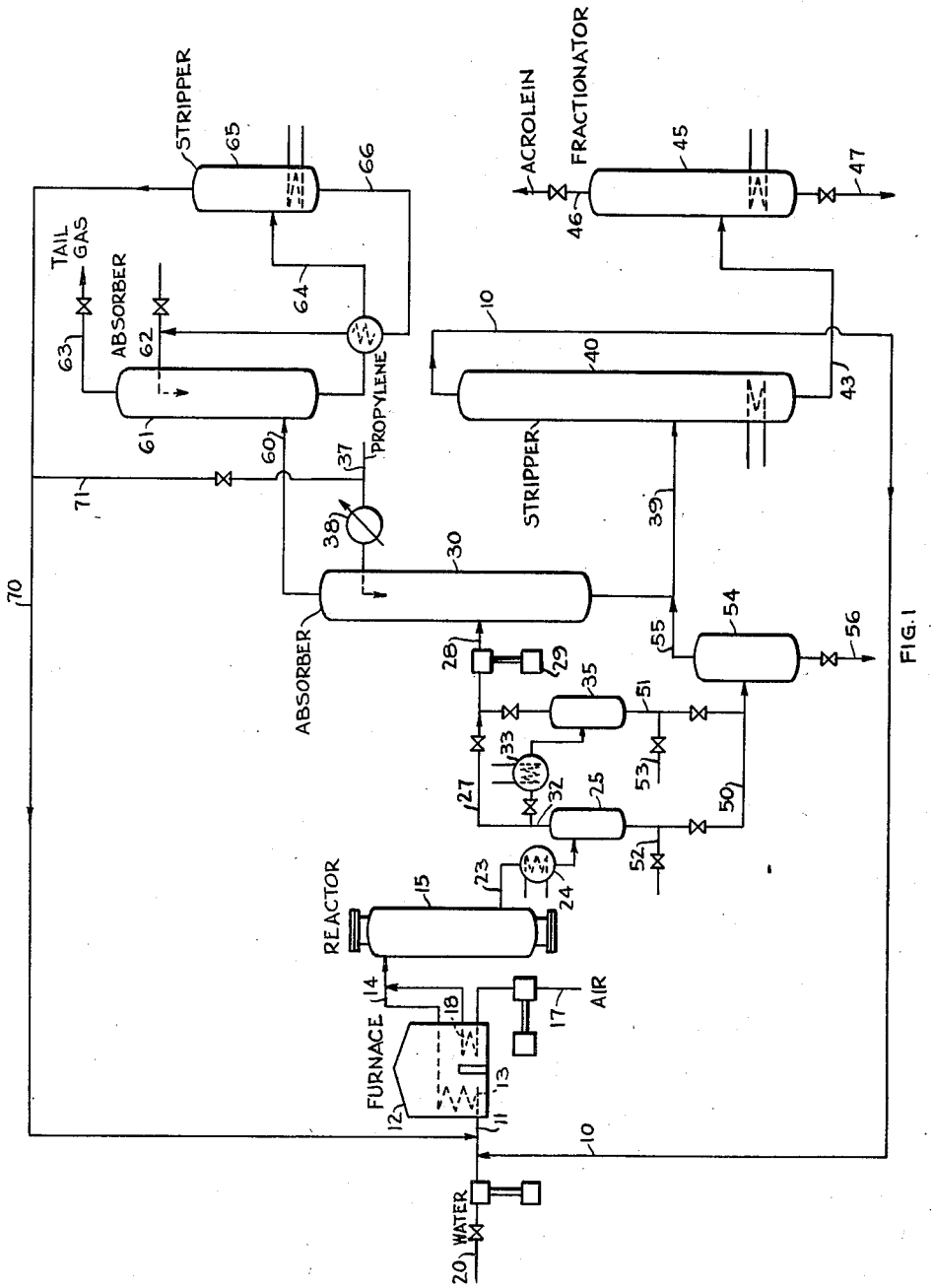

INVENTORS: ROBERT M. COLE
CLARENCE L. DUNN
GINO J. PIEROTTI

Aug. 12, 1952   R. M. COLE ET AL   2,606,932
PRODUCTION OF UNSATURATED CARBONYLIC COMPOUNDS
Filed July 31, 1950   2 SHEETS—SHEET 2
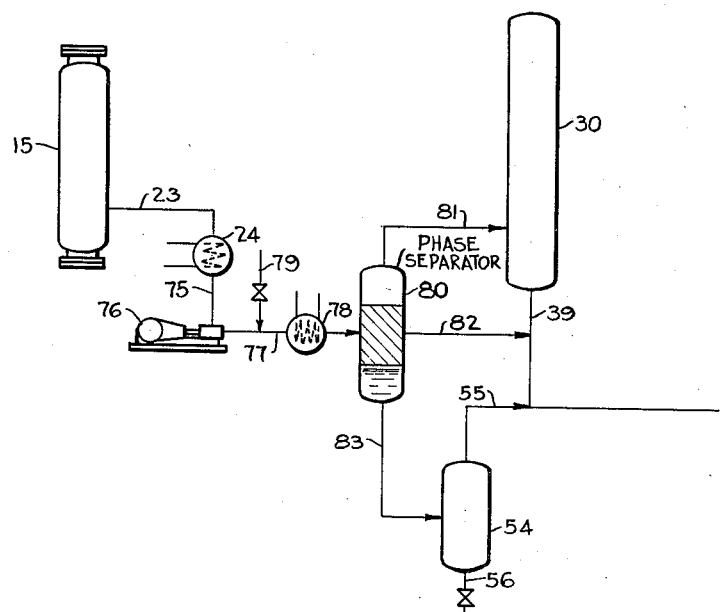
FIG. II
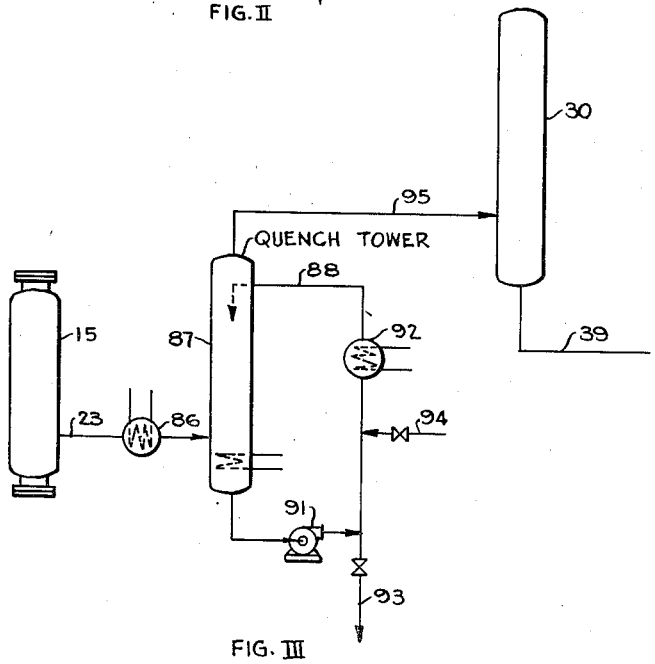
FIG. III
INVENTORS: ROBERT M. COLE
CLARENCE L. DUNN
GINO J. PIEROTTI
BY THEIR AGENT:

Patented Aug. 12, 1952

2,606,932

UNITED STATES PATENT OFFICE 2,606,932

PRODUCTION OF UNSATURATED CARBONYLIC COMPOUNDS

Robert M. Cole, Oakland, Clarence L. Dunn, Berkeley, and Gino J. Pierotti, Albany, Calif., assignors to Shell Development Company, San Francisco, Calif., a corporation of Delaware Application July 31, 1950, Serial No. 176,853

7 Claims. (Cl. 260—604)

This invention relates to the production of alpha,beta-unsaturated carbonylic compounds by the oxidation of hydrocarbons having at least three carbon atoms to the molecule. The invention relates more particularly to the production of alpha-methylene aldehydes and ketones by the oxidation of olefins having at least three carbon atoms to the molecule. A particular aspect of the invention relates to the production of alpha-methylene aldehydes having from three to four carbon atoms to the molecule by the oxidation of normally gaseous hydrocarbons comprising the corresponding olefins.

Production of alpha,beta-unsaturated carbonylic compounds on a practical scale generally results in the obtaining of a crude product comprising a desired unsaturated carbonylic compound in admixture with substantial amounts of by-products unavoidably formed during the process. The ability to utilize the unsaturated carbonylic compounds, such as the alpha-methylene aldehydes and/or ketones efficiently in many fields of application is often dependent upon the absence therein of any substantial amount of impurities. The large-scale production of an alpha,beta-unsaturated aldehyde or ketone of relatively high purity is, of necessity, limited to methods enabling the obtaining of a product comprising the unsaturated carbonylic compound in admixture with impurities which are readily separable therefrom by available practical scale separating means. Thus, the production of acrolein from such starting materials as, for example, acetaldehyde and formaldehyde under carefully controlled conditions often enables the attainment of a product comprising the acrolein in admixture with impurities consisting essentially of acetaldehyde, formaldehyde and relatively high-boiling organic materials. All of such impurities are readily separable from the acrolein on a practical scale by methods available heretofore comprising such steps as simple fractionation, water scrubbing, distillation and the like. Although acrolein of relatively high purity can be obtained by such methods these processes are generally handicapped by unavailability at sufficiently low cost of the starting materials. A particularly valuable source of the unsaturated carbonylic compounds comprises the products obtained by the oxidation of the readily available hydrocarbons. It has recently been found that the readily available hydrocarbons comprising olefins having at least three carbon atoms to the molecule, can be converted efficiently to products consisting predominantly of alpha,beta-unsaturated carbonylic compounds, such as, for example, the alpha,beta-unsaturated aliphatic aldehydes and ketones by catalytic oxidation. Thus, unsaturated carbonylic compounds consisting essentially of acrolein and methacrolein are obtained by the catalytic oxidation of propylene and isobutylene, respectively. The effluence from the hydrocarbon oxidizing zone in such processes, however, is an exceedingly complex mixture and contains the desired unsaturated carbonylic compound in admixture with saturated carbonylic compounds such as saturated aldehydes and ketones inseparable therefrom on a practical scale by the methods applicable to the treatment of less complex mixtures. The production of an alpha,beta-unsaturated aliphatic aldehyde from the corresponding olefin, such as, for example, the production of acrolein from propylene, results in the production of a complex mixture comprising the acrolein in admixture not only with readily separable impurities such as formaldehyde, acetaldehyde and high-boiling material but also close-boiling carbonylic compounds such as, for example, propionaldehyde and acetone, inseparable therefrom on a practical scale by simple distillation, water scrubbing or the like. Inability to effect the efficient and yet substantially complete recovery of the unsaturated aldehydes from the hydrocarbon oxidation products containing them has militated against any full realization of the substantial advantages as a source of these highly desirable and valuable compounds.

In co-pending applications Serial Nos. 1,314, now U. S. Patent No. 2,514,966, 49,816, now U. S. Patent No 2,514,967 and 84,074 there have been described and claimed methods for the recovery of alpha,beta-unsaturated aldehydes from the crude alpha,beta-unsaturated aldehydes comprising saturated carbonylic impurities having boiling temperatures approximating those of the alpha,beta-unsaturated aldehydes. These processes, however, generally necessitate the initial separation of a crude alpha,beta-unsaturated aldehyde from the effluence from the hydrocarbon oxidizing zone. The separation of a crude unsaturated aldehyde may be effected by scrubbing the hydrocarbon oxidation products emanating from the hydrocarbon oxidation zone with water to effect a substantially complete separation of normally gaseous materials, generally including fixed gases and unconverted hydrocarbons, from carbonylic hydrocarbon reaction products. Such separation generally necessitated the use of exceedingly large quantities of water. The passage of such inordinately large amounts of water through such scrubbing zone not only renders difficult the maintenance of relatively constant conditions conducive to the attainment of optimum results, but materially increases initial installation and overall operating costs of the process. In such method of operation not only all of the inert gas but also substantially all unconverted hydrocarbons are passed overhead from the scrubber. Since operation of the process on a practical scale necessitates the recycling of unconverted hydrocarbons, inordinately large volumes of material must be passed overhead from the scrubber to a suitable recycle recovery system in such processes. Further difficulties inherent in such methods of operations as used heretofore reside in the fact that the maximum permissible pressure within the product scrubber is governed by the pressure at which the hydrocarbon components of the charge thereto begin to condense. The use of water as scrubbing medium generally allows relatively little variation of conditions within the scrubber without incurring either the condensation of excessive amounts of hydrocarbon or the highly undesirable consequence involving the passage of carbonylic constituents overhead.

It is an object of the present invention to provide an improved process enabling the more efficient production of alpha,beta-unsaturated carbonylic compounds by the oxidation of hydrocarbons wherein the above difficulties are obviated to at least a substantial degree.

Another object of the invention is the provision of an improved process enabling the more efficient production of alpha,beta-unsaturated carbonylic compounds by the oxidation of olefinic hydrocarbons wherein difficulties heretofore encountered in the separation of carbonylic compounds from the hydrocarbon oxidation zone effluence are obviated to at least a substantial degree.

A more particular object of the invention is the provision of an improved process enabling the more efficient production of alpha,beta-unsaturated hydrocarbons having from three to four carbon atoms to the molecule by the oxidation of hydrocarbons comprising olefins having from three to four carbon atoms to the molecule.

A still more particular object of the invention is the provision of an improved process enabling the more efficient production of acrolein by the oxidation of normally gaseous hydrocarbons comprising propylene. Other objects and advantages of the invention will become apparent from the following detailed description thereof.

In accordance with the invention substantial improvements in the production of alpha,beta-unsaturated carbonylic compounds by catalytic oxidation of hydrocarbons comprising olefins is obtained by introducing at least a part of the hydrocarbon feed to the process into an absorption zone wherein said feed is brought into direct contact with effluence from the hydrocarbon oxidation zone under conditions effecting the separation of carbonylic components from said reactor effluence with the formation of a fraction in the liquid state comprising said carbonylic compounds and said hydrocarbon feed and a gaseous fraction comprising fixed gases. Carbonylic compounds are recovered from the fraction separated in the liquid state in the absorption zone, and hydrocarbon components remaining after such separation are introduced into the hydrocarbon oxidation zone of the process wherein they are subjected to conditions resulting in the oxidation of hydrocarbons to reaction products comprising alpha,beta-unsaturated carbonylic compounds. In the production, in accordance with the invention, of an alpha, beta-unsaturated carbonylic compound, such as, for example, acrolein, by the controlled catalytic oxidation of normally gaseous hydrocarbons comprising propylene, the normally gaseous hydrocarbons to be oxidized are passed in the liquid state through an absorption zone countercurrent to acrolein-containing effluence from the hydrocarbon oxidation zone, thereby separating acrolein-containing carbonylic compounds from the effluence of the hydrocarbon oxidizing zone with the formation of a liquid fraction consisting essentially of hydrocarbons comprising propylene and acrolein-containing carbonylic compounds and a gaseous fraction comprising fixed gases. The liquid fraction formed in the absorption zone is fractionated to separate a fraction consisting essentially of normally gaseous hydrocarbons comprising propylene and a fraction comprising acrolein-containing carbonylic compounds therefrom. Acrolein is separated from the fraction comprising acrolein-containing carbonylic compounds as a final product. The normally gaseous hydrocarbons comprising propylene separated from the liquid fraction formed in the absorption zone, are employed as the hydrocarbon charge to the hydrocarbon oxidizing zone wherein they are subjected to hydrocarbon oxidizing conditions resulting in the oxidation of propylene to reaction products comprising acrolein.

Conditions maintained within the hydrocarbon oxidation zone of the process comprise broadly those capable of converting hydrocarbons to carbonylic reaction products comprising alpha,beta-unsaturated carbonylic compounds. Particularly preferred conditions to be maintained within the reaction zone of the process comprise the catalytic hydrocarbon oxidizing conditions set forth in United States Patent 2,451,485, under which conditions hydrocarbons containing olefins having at least three carbon atoms to the molecule are converted to alpha-methylene carbonylic compounds, that is, to unsaturated aldehydes and ketones containing an olefinic linkage between two carbon atoms of aliphatic character, one of which carbon atoms is directly linked to an aldehyde or ketone group. Under the conditions of said patent the desired hydrocarbon oxidation is obtained by contact of the hydrocarbon charge in admixture with oxygen, or an oxygen-containing gas, with a cuprous oxide-containing catalyst at a temperature in the range of from about 150° C. to about 600° C., and preferably from about 200° C. to about 450° C.

Olefins having three or more carbon atoms to the molecule capable of being converted to alpha-methylene aldehydes and ketones, also referred to as vinyl-type aldehydes and ketones or alpha,beta-unsaturated aldehydes and ketones, in accordance with the invention, comprise the open- and closed-chain olefins such as, for example, propylene, butene-1, butene-2, isobutylene, pentene-1, pentene-2, 3-methyl-butene-1, 2-methyl-butene-2, hexene-1, hexene-2, 4-methyl-pentene-1, 3,3-dimethyl-butene-1, 4-methyl-pentene-2, octene-1, cyclopentene, cyclohexene, 3-methylcyclohexene, etc. The hydrocarbons converted to the unsaturated carbonylic compounds within the hydrocarbon oxidizing zone of the process may comprise other hydrocarbons such as, for example, paraffinic hydrocarbon of straight or open-chain structure which may or may not undergo reaction under the oxidation conditions employed within the oxidation zone of the process.

Additional materials such as, for example, normally gaseous materials or normally liquid materials which are vaporized, or which are in the gaseous state under the conditions of execution of the hydrocarbon oxidation reaction may be introduced into the hydrocarbon oxidation zone. In a preferred method of carrying out the process of the invention the hydrocarbon oxidation reaction is executed in the presence of added water vapor.

The process of the invention is applied with particular advantage to the production of alpha, beta-unsaturated aliphatic aldehydes and ketones having three and four carbon atoms to the molecule by oxidation of normally gaseous hydrocarbons comprising olefins having from three to four carbon atoms to the molecule. In order to set forth more fully the nature of the invention it will be described in detail herein to the production of acrolein from normally gaseous hydrocarbons comprising propylene with reference to the attached drawing wherein Fig. I represents a more or less diagrammatical elevational view of one form of apparatus suitable for carrying out the proces of the invention, and Figs. II and III each represent a diagrammatical elevational view of an alternative form of that portion of apparatus of Fig. I between reactor 15 and absorber 30. Identical parts of the apparatus have been indicated in the figures of the drawing by like reference characters.

Referring to the drawing, hydrocarbons having at least three carbon atoms to the molecule, for example, a stream of normally gaseous hydrocarbons comprising propylene, emanating from within the system as described more fully hereinbelow, is forced through lines 10 and 11, coil 13 positioned in structure 12, and transfer line 14 into a suitable reaction zone. The reaction zone may comprise one or more zones of enlarged cross-sectional area, such as, for example, a reaction chamber 15. The reaction zone may furthermore comprise one or more zones of restricted cross-sectional area, not shown in the drawing, such as a coil or tubular reactor. Oxygen, or an oxygen-containing gas such as air, taken from an outside source is forced through line 17 and coil 18 into transfer line 14 wherein it mingles with the hydrocarbon stream entering reaction chamber 15.

Within reaction chamber 15 the hydrocarbon stream in admixture with the oxygen, or oxygen-containing gas, is contacted with a suitable oxidation catalyst under hydrocarbon oxidizing conditions resulting in the interaction of propylene and oxygen with the formation of reaction products comprising acrolein. As indicated above the process of the invention is not limited in its application to the use of specific oxidizing conditions within reactor 15. Preferred propylene oxidizing conditions, however, comprise those set forth in U. S. Patent 2,451,485 under which propylene reacts with oxygen with the formation of reaction products comprising acrolein.

Temperature conditions within reactor 15 are maintained by controlling the heat input into the streams flowing through coils 13 and 18, and optionally by other means not shown in the drawing. Steam is preferably introduced into the reaction zone. Water taken from an outside source by means of a line 20 is, therefore, forced into line 11 leading to coil 13.

Oxidation of the propylene-containing hydrocarbons within reactor 15 will result in the obtaining of reaction products comprising not only the desired acrolein but other reaction products comprising, for example, acetone, acetaldehyde, propionaldehyde, and the like, as well as substantial amounts of normally gaseous reaction products such as carbon monoxide, carbon dioxide, nitrogen, etc. In addition the reaction products will be admixed with considerable quantities of unconverted hydrocarbons and some water. In the oxidation of propylene at a temperature of about 360° C. in the presence of a cuprous oxide catalyst wherein the mole ratio of air to propylene charged to the reaction zone was approximately 6.0, the reactor effluence contained approximately 28.2 moles of normally gaseous material consisting predominantly of propylene, nitrogen, carbon dioxide, carbon monoxide, and oxygen, for each mole of total carbonyl compounds. The total carbonyl compounds in the mixture had the following composition:

| | Per cent by weight |
|---|---|
| Acrolein | 90 |
| Acetaldehyde | 6 |
| Propionaldehyde | 2 |
| Acetone | 2 |

Practical scale operation of the process necessitates not only the efficient separation of the carbonylic reaction products from the reactor effluence but the recycling of the unconverted hydrocarbons to the reaction zone. Contrary to methods disclosed heretofore wherein substantially all normally gaseous components, including unconverted normally gaseous hydrocarbons, are separated from carbonylic compounds by a scrubbing operation employing water as scrubbing agent, the process of the present invention effects the initial separation of a fraction in the liquid state comprising not only the carbonylic reaction products but unconverted normally gaseous hydrocarbons from a gaseous fraction comprising inert gaseous components of the effluent stream from reactor 15. In accordance with the process of the invention the effluent stream from reactor 15 is passed through line 23 and cooler 24 into a separator 25. Within separator 25, a liquid phase, consisting essentially of water condensed by the lowering of temperature of the stream occasioned by pasage through cooler 24, is separated. The aqueous phase thus formed in separator 25 will comprise substantially all formaldehyde and higher boiling polymeric material formed in reactor 15, as well as aldehydes higher boiling than formaldehyde in equilibrium concentrations.

The reactor effluence, now free of most of its water content, may be passed directly from separator 25, through valved lines 32, 27 and 28, into an absorption zone, such as, for example, an absorption column 30. If desired, however, cooling of the reactor effluence, and separation of water therefrom, may be effected by passage through a plurality of separate and successive coolers and separators. Thus the stream leaivng separator 25 through line 32 may be passed through line 32 and cooler 33 into a second separator 35. Reactor effluence now substantially free of water is passed from separator 35, through valved line 28, provided with compressor 29, into absorber 30.

Within absorber 30 the reactor effluence is passed upward, countercurrent to a stream of cool liquefied normally gaseous hydrocarbons comprising propylene, which normally gaseous hydrocarbons may constitute the entire hydrocarbon charge to the system. The normally gaseous hydrocarbons comprising propylene, emanating from an outside source, are forced through line 37 provided with cooling means, such as a cooler 38, into the upper part of absorber 30. In passing through cooler 38 the hydrocarbons are cooled to a temperature at least sufficiently low to assure the introduction of at least the greater part of the normally gaseous hydrocarbon stream into the upper part of absorber 30 in the liquid state. Conditions within absorber 30 are controlled to obtain the absorption by the liquid normally gaseous hydrocarbon stream introduced through line 37 of substantially all of the carbonylic compounds contained in the stream entering absorber 30 through line 28, as well as the condensation of at least a substantial part of unconverted olefinic hydrocarbons.

Although but a single absorber column is shown in the drawing it is to be understood that a plurality of two or more such absorption columns may be employed within the scope of the invention, and the hydrocarbon feed to the process apportioned to each of the absorber columns. The invention is, furthermore, not limited to the use of a column-type absorber and any suitable type of contacting device enabling efficient contact of the hydrocarbon charge and the effluent stream from reactor 15, may be comprised in the absorption zone.

The temperature at which the absorption is carried out within absorber 30 may vary considerably within the scope of the invention in accordance with the nature of the components comprised in the reactor effluence, and of the hydrocarbon feed to the system, and the pressure employed. Care is taken to maintain the temperature within absorber 30 below that at which any substantial vaporization of the olefinic hydrocarbon components of the streams charged thereto will take place. Thus, in the production of acrolein from normally gaseous hydrocarbons comprising propylene the absorption may be carried out at pressures within the range of from about 100 to about 400 pounds per square inch absolute within the absorber 30. Temperature conditions within absorption column 30 are maintained with the aid of coolers 24, 23 and 38 and optionally by other temperature controlling means not shown in the drawing.

Enriched absorbing medium consisting essentially of normally gaseous hydrocarbons comprising propylene in admixture with acrolein-containing carbonylic reaction products are passed from the lower part of absorber 30 through line 39 into a suitable separating zone. The separating zone may comprise any conventional means enabling the separation of acrolein-containing carbonylic compounds from the enriched normally gaseous absorbent. The separating zone may comprise, for example, a stripping column 40, wherein normally gaseous hydrocarbons comprising propylene are separated as a vapor fraction from a liquid fraction comprising acrolein-containing carbonylic compounds. The liquid fraction separated in fractionator 40 is passed through line 43 into suitable means enabling the separation of acrolein therefrom. The acrolein recovery means may comprise, for example, a fractionator 45, wherein an overhead fraction comprising acrolein is separated from a liquid bottoms fraction comprising carbonylic compounds higher boiling than acrolein. Overhead comprising the desired acrolein is taken from fractionator 45 through valved line 46. Bottoms comprising carbonylic compounds higher boiling than acrolein are taken from the lower part of fractionator 45 through valved line 47. Acrolein removed from the system through valved line 46, or the crude acrolein stream flowing through line 43, may be subjected to purifying means such as, for example, the methods described and claimed in co-pending U. S. applications Serial Nos. 1,314; 49,816 and 84,074. A particularly advantageous purifying means is that described and claimed in copending application Serial No. 176,854, filed July 31, 1950, wherein the crude acrolein is subjected to extraction in an extraction zone wherein water is employed as a primary solvent and the hydrocarbon stream emanating from line 10 as a secondary solvent, thereby effecting in a single operation the simultaneous purification of the crude acrolein and the hydrocarbon prior to its passage to the reaction zone.

Normally gaseous hydrocarbons comprising propylene separated as a vapor fraction within fractionator 40 are passed through valved line 10 into valved line 11. The hydrocarbon charge to reactor 15 thus consists essentially of the normally gaseous hydrocarbons comprising propylene which have functioned as absorption medium in absorber 30 and unconverted hydrocarbons recovered from the effluent stream emanating from reactor 15.

The aqueous phase separated in separators 25 and 35 is eliminated therefrom through valved lines 50 and 51, respectively. The aqueous phase thus drawn from separators 25 and 35 may be eliminated from the system through valved lines 52 and 53. Residual amounts of carbonylic constituents including acrolein, contained in the aqueous phase separated in separators 25 and 35, may be recovered therefrom, however, by any suitable means, such as, for example, by distillation in a still 54. Carbonylic constituents comprising acrolein are taken overhead from still 54 and passed through line 55 into line 39. Aqueous bottoms are removed from still 54 by means of valved line 56.

Substantially all carbonylic reaction products are therefore recovered from the effluent stream leaving the hydrocarbon oxidation zone of the process without the need for any solvent for the absorption operation other than the normally gaseous hydrocarbon feed to the process.

Overhead from the absorber 30 will comprise a mixture of inert gases saturated with normally gaseous hydrocarbons comprising propylene. Residual amounts of propylene remaining in the gaseous overhead from absorber 30 are readily separated economically therefrom because of the reduction in volume over the amount of gases normally encountered in operations wherein substantially all of the hydrocarbons are comprised in the absorber overhead. The gaseous stream passing through line 60 may therefore be passed to suitable means for the recovery of propylene therefrom for recycling to the reaction zone. Suitable means for the recovery of residual propylene from the overhead of column 30 may comprise a second absorption zone comprising absorption column 61, wherein the gaseous stream is contacted countercurrently with a descending stream of absorbent, such as a higher boiling hydrocarbon stream, for example, a gas oil, introduced into the upper part of column 61 by means of valved line 62. In column 61 propylene is absorbed by the gas oil stream and inert tail gas, comprising oxides of carbon, nitrogen, etc. is eliminated from the system through valved line 63. Gas oil enriched with absorbed propylene is passed through line 64 to a suitable still 65, wherein propylene is flashed off. Propylene is passed through valved line 70 into line 11. Lean scrubbing medium is returned from the lower part of stripper 65, through line 66, to the upper part of absorber column 61. A valved line 71 provides communication between lines 70 and 37 for the passage of hydrocarbons comprising propylene therethrough.

It is to be understood that modifications within the scope of the invention may be made in the process as set forth in the foregoing detailed illustrative description thereof. Thus, modifications may be made in the method employed in the cooling of the stream passing from reactor 15 to absorber 30, and in the removal of water therefrom. In a modification of the process of the invention as illustrated by Fig. II of the attached drawing, the effluent stream leaving reactor 15 through line 23 is cooled in suitable cooling means, such as, for example, a cooler 24, and thereafter compressed to a high pressure. Thus, the cooled stream leaving cooler 24 is passed into compressor 76 wherein it is compressed, and thence through line 77 into a phase separator 80. Additional cooling means, such as, for example, a cooler 78, is provided to cool the compressed stream flowing through line 77. Further cooling means may be resorted to, for example, the introduction of a quenching medium, such as water, into line 77 from an outside source by means of valved line 79. In passing through compressor 76 the cooled reactor effluence is compressed to any pressure sufficiently high to enable the formation of three phases, two liquid phases and a vapor phase, within separator 80. The lower liquid phase will consist essentially of water containing formaldehyde and any higher polymeric reaction products formed in the system. The intermediate liquid layer will consist essentially of propylene and acrolein-containing carbonylic reaction products. The vapor phase will comprise acrolein-containing carbonylic reaction products, hydrocarbons, and normally gaseous components of the reactor effluence. The lower aqueous phase is passed from separator 80 through line 83 into still 54, wherein carbonylic constituents are distilled therefrom as described above. The intermediate liquid phase, consisting of propylene and acrolein-containing carbonylic reaction products, is passed through line 82 into line 39. The vapor phase is passed from separator 80 through line 81 into absorber 30 to be treated therein as described above. The modification of the process wherein the reactor effluence is compressed to a high pressure reduces still further the load placed upon absorber 30.

A method of cooling the reactor effluence particularly preferred in the production of acrolein by the oxidation of propylene is illustrated by the Figure III of the attached drawing. Therein the effluence emanating from reactor 15 through line 23 is passed through line 85 into a suitable quenching chamber such as, for example, a tower 87. Baffles, bubble trays, inert packing, or the like, may be provided in tower 87. Suitable heat exchanging means, such as, for example, an indirect heat exchanger 86, may be provided in line 85 to enable the withdrawal of heat from the stream flowing through line 23 by indirect heat exchange with a suitable cooling agent which may comprise a side-stream taken from within the system. Within tower 87 the reactor effluence is passed upwardly countercurrent to a stream of water introduced into the upper part of tower 87 by means of line 88. Heating means such as, for example, a reboiler or a closed heating coil 89, is provided in the lower part of tower 87. Conditions within tower 87 are controlled to effect the separation therein of aqueous liquid bottoms containing substantially all formaldehyde and higher-boiling polymeric materials formed in the system, but containing no substantial amount of acrolein. Liquid bottoms are withdrawn from tower 87 and continuously recirculated to the upper part of tower 87 by means of line 88 provided with pump 91. Means for controlling the temperature of the water introduced into the upper part of tower 87, such as a cooler, or a heat exchanger 92, is provided in line 88. Conditions within tower 87 enabling the separation of substantially all water of reaction as bottom, with the passage of substantially all of the desired unsaturated aldehyde overhead, is obtained by control of the temperature of the bottoms in the tower and the water introduced into the top thereof by means of coil 89 and exchanger 92, respectively. An amount of water generally at least equal to the amount of water introduced into, or formed within, the reaction zone is bled intermittently or continuously from the system through valved line 93. A valved line 94 is provided for the introduction of water into line 88. In cooling the reactor effluence, and separating water therefrom by the method substantially as illustrated by the Fig. III of the drawing, not more than exceedingly small amounts of the desired unsaturated aldehyde, such as acrolein, will be contained in the aqueous stream eliminated from the system through valved line 93. The aqueous stream drawn from tower 87 through valved line 93 may be subjected to conventional processing means not shown in the drawing comprising, for example, one or more such steps as distillation, extractive distillation, absorption, and the like, to recover therefrom any carbonylic compounds which may be contained therein. Overhead from tower 87, consisting of effluence from reactor 15, now free of any substantial amount of water, is passed through line 95 into absorber 30, to be treated therein as described in the present detailed description of the invention.

For the purpose of clarity, all parts of apparatus not essential to a complete description of the invention such as, for example, pumps, condensers, accumulators, etc., have been omitted from the drawing and the description of the invention.

The following examples are illustrative of the production of alpha,beta-unsaturated aldehydes in accordance with the invention:

EXAMPLE I

Propylene is oxidized to acrolein-containing reaction products by contacting a mixture of propylene and oxygen, containing a mole ratio of propylene to oxygen of 6, with a cuprous oxide catalyst at a temperature of about 360° C. The resulting reaction mixture is compressed at a temperature of about 20° C. to the pressure at which a propylene liquid phase starts to appear. The residual gaseous phase of the compressed reactor effluence is introduced into an absorber column wherein it is contacted countercurrently with a stream of liquefied propylene. The absorption is carried out at a temperature of 20° C. and at a pressure of 260 pounds per square inch absolute in a column equivalent to one of ten theoretical plates. The operation is repeated under substantially identical conditions with the exception that water is substituted for the liquefied propylene stream introduced into the absorption column. The amount of solvent required in the absorption operation to obtain an overall recovery of acrolein of 99.9+% is indicated in the following table for each of the separate operations.

Table I

| Absorber Solvent | Feed to Absorber (Moles) | | | Solvent Requirements (Moles) | Moles Solvent per Mole Acrolein in Absorber Feed |
|---|---|---|---|---|---|
| | Acrolein | Propylene | Total Feed | | |
| Propylene | 0.103 | 16.1 | 28.3 | 5.20 | 50.5 |
| Water | 0.103 | 16.1 | 28.3 | 18.1 | 176.0 |

EXAMPLE II

In two separate operations isobutylene is oxidized to methacrolein-containing reaction products by contacting a mixture of isobutylene and oxygen, containing a mole ratio of isobutylene to oxygen of 5, with a cuprous oxide catalyst at a temperature of about 360° C. The resulting reaction mixture is cooled and compressed to the pressure at which a liquid isobutylene phase begins to appear. The residual gaseous phase of the compressed reaction mixture is introduced into an absorber column wherein it is contacted countercurrently with a stream of liquefied isobutylene. The rate of introduction of the liquefied isobutylene into the upper part of the absorber is controlled to result in the obtaining of a methacrolein absorption of 99.9%. Each of the two operations is repeated under substantially identical conditions with the exception that water is substituted for the liquefied isobutylene stream introduced into the upper part of the absorber. The absorption is carried out in column having the equivalent of ten theoretical plates. Temperature and pressure of the absorption and amount of solvent required to obtain the desired degree of separation are indicated in the following table for each of the separate operations.

water introduced into the upper part of the quench tower is maintained at a temperature of from 20° to 50° C. The bottoms of the quench tower are maintained at a temperature of 80° to 100° C. Liquid aqueous bottoms containing formaldehyde are withdrawn from the tower part of the quench tower. The reactor effluence, now free of any substantial amount of water, is passed overhead from the quench tower into an absorber column having a capacity equivalent to ten theoretical plates. The reactor effluence introduced into the absorber column contained 29.3 moles of normally gaseous material consisting predominantly of propylene, carbon monoxide, carbon dioxide, nitrogen and oxygen, for each mole of total carbonylic compounds. The total carbonylic compounds in the mixture had the following approximate composition:

| | Per cent by weight |
|---|---|
| Acrolein | 90.0 |
| Acetaldehyde | 6.0 |
| Propionaldehyde | 2.0 |
| Acetone | 2.0 |

Liquefied propylene, taken from an outside source, is introduced into the top of the absorber column at a controlled rate to obtain absorption of 99.9+% of the acrolein content of the reaction mixture charged to the absorber column. The absorption is carried out at a temperature of 20° C., and a pressure of 260 pounds per sq. in. abs. 557 moles of liquefied propylene is introduced into the upper part of the absorber for each mole of acrolein charged to the absorber.

The liquid propylene phase containing the absorbed acrolein-containing carbonylic reaction products is taken from the absorber and distilled to strip propylene therefrom, leaving liquid still bottoms consisting essentially of the acrolein-containing carbonylic reaction products. The propylene thus stripped from the absorber bottoms is employed as the propylene charge to the reactor wherein propylene is oxidized to acrolein. The acrolein-containing carbonylic reaction remaining as still bottoms after stripping propylene from the absorber bottoms are fractionated to separate acrolein of 93.0% purity therefrom. A conversion of propylene to acrolein-containing oxygenated compounds of 8.9% is obtained with a yield of acrolein of 61.5%.

EXAMPLE IV

Isobutylene is oxidized to methacrolein by contacting a mixture of isobutylene and air, containing a ratio of isobutylene to oxygen of 5, with a cuprous oxide catalyst in the presence of added steam at a temperature of about 360° C. The reactor effluence contained:

Table II

| Temp., °C | Pressure, P. s. i. a. | Absorption Solvent | Feed to Absorber (Moles) | | | Solvent Requirements (Moles) | Moles Solvent per Mole Methacrolein in Absorber Feed |
|---|---|---|---|---|---|---|---|
| | | | Methacrolein | Isobutylene | Total Feed | | |
| 20 | 70.4 | Isobutylene | 0.743 | 24.0 | 45.8 | 8.11 | 10.9 |
| 30 | 95.5 | do | 0.793 | 24.0 | 46.0 | 7.52 | 9.48 |
| 20 | 70.4 | Water | 0.743 | 24.0 | 45.8 | 205 | 276 |
| 30 | 95.5 | do | 0.793 | 24.0 | 46.0 | 247 | 312 |

EXAMPLE III

Propylene is oxidized by contacting a mixture of propylene and air containing a mole ratio of propylene to oxygen of 6 with a cuprous oxide catalyst at a temperature of about 375° C. in a reactor. The reactor effluence is introduced into a quench tower wherein it passes upwardly countercurrent to a stream of water introduced into the upper part of the quench tower. The

| | Moles |
|---|---|
| Isobutylene | 24.0 |
| Water | 53.8 |
| Methacrolein | 1.17 |
| Total carbonyl compounds | 1.31 | for each 100 moles of reactor effluent. The remainder of the reactor effluence consists predominantly of normally gaseous materials such as nitrogen, carbon monoxide, carbon dioxide, oxygen. The total carbonylic compounds in the mixture has the following approximate composition:

| | Per cent by weight |
|---|---|
| Methacrolein | 91.6 |
| Propionaldehyde | 1.4 |
| Acetaldehyde | 2.2 |
| Acetone | 3.4 |
| Acrolein | 1.4 |

The total reactor effluence is compressed, cooled, and introduced into a phase separator maintained at a temperature of 20° C. and a pressure of 114.7 pounds per square inch absolute, resulting in the formation of two distinct liquid phases and a gas phase in the phase separator. The distribution of the methacrolein and isobutylene in the phase separator based on 100 moles of reactor effluence is as follows:

| | Moles |
|---|---|
| Gas phase: | |
| Isobutylene content | 9.87 |
| Methacrolein | 0.090 |
| Isobutylene liquid phase: | |
| Isobutylene content | 14.1 |
| Methacrolein | 0.957 |
| Aqueous phase: | |
| Isobutylene content | 0.0 |
| Methacrolein | 0.123 |

The gas phase is passed from the phase separator into an absorber column wherein it is brought into countercurrent contact with a stream of liquefied isobutylene passed into the upper part of the absorber from an outside source. The absorber is maintained at a temperature of 20° C. and a pressure of 114.7 pounds per square inch absolute.

Liquid isobutylene containing the absorbed methacrolein taken from the absorber and admixed with the liquid phase from the phase separator is distilled to strip the isobutylene therefrom, leaving liquid bottoms consisting essentially of methacrolein-containing carbonylic reaction products. Isobutylene thus stripped from the admixed absorber bottoms and phase separator liquid phase is used as isobutylene charge introduced into the reactor wherein isobutylene is oxidized to methacrolein. The methacrolein-containing still bottoms remaining after stripping the isobutylene from the admixed absorber bottoms and phase separator liquid phase are fractionated to separate a fraction comprising methacrolein therefrom. 97% of the methacrolein content of the total crude methacrolein-containing carbonylic reaction products is recovered as methacrolein of 98% purity with the use of only 21.6 moles of isobutylene as absorbing agent in the absorber per mole of methacrolein fed to the absorber.

The invention claimed is:

1. In a process for the production of acrolein wherein normally gaseous hydrocarbons comprising propylene are subjected to oxidizing conditions in a reaction zone with the formation of a reaction mixture comprising acrolein-containing carbonylic compounds, propylene and fixed gases, the steps which comprise contacting said reaction mixture with a stream of liquefied normally gaseous hydrocarbons comprising propylene, thereby absorbing acrolein-containing carbonylic compounds in said liquefied normally gaseous hydrocarbons with the formation of a gaseous phase comprising fixed gases substantially free of carbonylic compounds and a liquid phase consisting essentially of normally gaseous hydrocarbons comprising propylene and acrolein-containing carbonylic compounds, stripping normally gaseous hydrocarbons comprising propylene from said liquid phase, and passing said normally gaseous hydrocarbons stripped from said liquid phase into said reaction zone.

2. In a process for the production of methacrolein wherein normally gaseous hydrocarbons comprising isobutylene are subjected to oxidizing conditions in a reaction zone with the formation of a reaction mixture comprising methacrolein-containing carbonylic compounds, isobutylene and fixed gases, the steps which comprise contacting said reaction mixture with a stream of liquefied normally gaseous hydrocarbons comprising isobutylene, thereby absorbing methacrolein-containing carbonylic compounds in said liquefied normally gaseous hydrocarbons with the formation of a gaseous phase comprising fixed gases substantially free of carbonylic compounds and a liquid phase consisting essentially of normally gaseous hydrocarbons comprising isobutylene and methacrolein-containing carbonylic compounds, stripping normally gaseous hydrocarbons comprising isobutylene from said liquid phase thereby leaving a liquid residue consisting essentially of methacrolein-containing carbonylic compounds, passing said normally gaseous hydrocarbons stripped from said liquid phase into said reaction zone, and separating methacrolein from said liquid residue.

3. In a process for the production of an alpha-methylene aldehyde having three to four carbon atoms to the molecule wherein normally gaseous hydrocarbons comprising an olefin having three to four carbon atoms to the molecule are subjected to olefin oxidizing conditions in a reaction zone with the formation of a reaction mixture comprising carbonylic compounds comprising an alpha-methylene aldehyde having three to four carbon atoms to the molecule in admixture with normally gaseous hydrocarbons and fixed gases, the steps which comprise contacting said reaction mixture with a stream of liquefied normally gaseous hydrocarbons comprising an olefin having three to four carbon atoms to the molecule, thereby absorbing said methylene-aldehyde-containing carbonylic compounds in said liquefied normally gaseous hydrocarbons with the formation of a gaseous phase comprising said fixed gases substantially free of carbonylic compounds and a liquid phase consisting essentially of said liquefied hydrocarbons and alpha-methylene aldehyde-containing carbonylic compounds, stripping said liquefied hydrocarbons from said liquid phase, and passing said hydrocarbons stripped from said liquid phase into said reaction zone.

4. In a process for the production of an alpha-methylene aldehyde wherein hydrocarbons comprising an olefin having at least three carbon atoms to the molecule are subjected to olefin oxidizing conditions in a reaction zone with the formation of a reaction mixture comprising alpha-methylene aldehyde-containing carbonylic compounds in admixture with unconverted hydrocarbons and fixed gases, the steps which comprise contacting said reaction mixture with a liquid stream of said hydrocarbons to be oxidized, thereby absorbing said alpha-methylene aldehyde-containing carbonylic compounds in a stream of hydrocarbons to be oxidized comprising an olefin having at least three carbon atoms in the molecule with the formation of a gaseous phase comprising said fixed gases substantially free of carbonylic compounds and a liquid phase consisting essentially of said hydrocarbons to be oxidized and alpha-methylene aldehyde-containing carbonylic compounds, stripping said hydrocarbons to be oxidized from said liquid phase, and passing said hydrocarbons stripped from said liquid phase into said reaction zone.

5. In a process for the production of an unsaturated carbonylic compound of the group consisting of alpha-methylene aldehydes and ketones having three carbon atoms to the molecule wherein normally gaseous hydrocarbons comprising an olefin having three to four carbon atoms to the molecule is subjected to olefin oxidizing conditions in a reaction zone with the formation of a reaction mixture comprising an unsaturated carbonylic compound of the group consisting of alpha-methylene aldehydes and ketones having three to four carbon atoms to the molecule in admixture with unconverted normally gaseous hydrocarbons and fixed gases, the steps which comprise contacting said reaction mixture with a stream of liquefied normally gaseous hydrocarbons to be oxidized comprising an olefin having three to four carbon atoms to the molecule, thereby absorbing said unsaturated carbonylic compound in said liquefied normally gaseous hydrocarbons with the formation of a gaseous phase comprising said fixed gases substantially free of carbonylic compounds and a liquid phase consisting essentially of said liquefied normally gaseous hydrocarbons and said unsaturated carbonylic compound, stripping said liquefied normally gaseous hydrocarbons from said liquid phase, and passing said normally gaseous hydrocarbons stripped from said liquid phase into said reaction zone.

6. In a process for the production of an unsaturated carbonylic compound of the group consisting of alpha-methylene aldehydes and ketones wherein hydrocarbons comprising an olefin having at least three carbon atoms to the molecule is subjected to olefin oxidizing conditions in a reaction zone with the formation of a reaction mixture comprising an unsaturated carbonylic compound of the group consisting of alpha-methylene aldehydes and ketones in admixture with unconverted hydrocarbons and fixed gases, the steps which comprise contacting said reaction mixture with a liquid stream of hydrocarbons to be oxidized comprising an olefin having at least three carbon atoms to the molecule, thereby absorbing said unsaturated carbonylic compound in said stream of hydrocarbons to be oxidized with the formation of a gaseous phase comprising said fixed gases substantially free of carbonylic compounds and a liquid phase consisting essentially of said hydrocarbons to be oxidized and said unsaturated carbonylic compound, stripping said hydrocarbons to be oxidized from said liquid phase, and passing said hydrocarbons stripped from said liquid phase into said reaction zone.

7. In a process for the production of an alpha, beta-unsaturated carbonylic compound wherein hydrocarbons comprising an olefin having at least three carbon atoms to the molecule is subjected to olefin oxidizing conditions in a reaction zone with the formation of a reaction mixture comprising an alpha,beta-unsaturated carbonylic compound in admixture with unconverted hydrocarbons and fixed gases, the steps which comprise contacting said reaction mixture with a liquid stream of hydrocarbons to be oxidized comprising an olefin having at least three carbon atoms to the molecule, thereby absorbing said alpha,beta-unsaturated carbonylic compound in said liquid stream of hydrocarbons to be oxidized with the formation of a gaseous phase comprising said fixed gases substantially free of carbonylic compounds and a liquid phase consisting essentially of said hydrocarbons to be oxidized and said unsaturated carbonylic compound, stripping said hydrocarbons to be oxidized from said liquid phase, and passing said hydrocarbons stripped from said liquid phase into said reaction zone.

ROBERT M. COLE.
CLARENCE L. DUNN.
GINO J. PIEROTTI.

REFERENCES CITED

The following references are of record in the file of this patent:

UNITED STATES PATENTS

| Number | Name | Date |
|---|---|---|
| 2,334,091 | Herstein | Nov. 9, 1943 |
| 2,451,485 | Hearnes et al. | Oct. 19, 1948 |
| 2,460,056 | Yowell et al. | Jan. 25, 1949 |